United States Patent
Schlee

(10) Patent No.: US 9,788,686 B2
(45) Date of Patent: Oct. 17, 2017

(54) ELECTRICALLY OPERATED DRINK MAKER, IN PARTICULAR ELECTRICALLY OPERATED COFFEE MACHINE, WITH STEAM LANCE FOR FROTHING UP MILK

(71) Applicant: WMF Group GmbH, Geislingen/Steige (DE)

(72) Inventor: Alexander Schlee, Geislingen (DE)

(73) Assignee: WMF Group GmBH, Geislingen/Steige (DE)

( * ) Notice: Subject to any disclaimer, the term of this patent is extended or adjusted under 35 U.S.C. 154(b) by 0 days.

(21) Appl. No.: 14/555,168

(22) Filed: Nov. 26, 2014

(65) Prior Publication Data
US 2015/0150408 A1  Jun. 4, 2015

(30) Foreign Application Priority Data
Nov. 28, 2013 (DE) .................. 10 2013 224 400

(51) Int. Cl.
*B01F 3/04* (2006.01)
*A47J 31/44* (2006.01)
*B01F 5/04* (2006.01)

(52) U.S. Cl.
CPC ....... *A47J 31/4485* (2013.01); *A47J 31/4489* (2013.01); *B01F 3/04439* (2013.01); *B01F 3/04446* (2013.01); *B01F 3/04815* (2013.01); *B01F 3/04992* (2013.01); *B01F 5/0413* (2013.01); *B01F 2003/04936* (2013.01); *B01F 2003/04943* (2013.01); *B01F 2215/0006* (2013.01)

(58) Field of Classification Search
CPC ............... A47J 31/4485; A47J 31/4489; B01F 3/04439; B01F 3/04446; B01F 3/04992; B01F 3/04815; B01F 5/0413; B01F 2003/04943; B01F 2003/04936; B01F 2215/0006
USPC ............................................ 261/76, DIG. 26
See application file for complete search history.

(56) References Cited

U.S. PATENT DOCUMENTS

| 4,949,631 A | * | 8/1990 | Fregnan | A47J 31/4485 261/DIG. 26 |
| 4,960,042 A | * | 10/1990 | Grossi | A47J 31/4485 137/893 |
| 5,207,148 A | | 5/1993 | Anderson et al. | |

(Continued)

FOREIGN PATENT DOCUMENTS

| DE | 4445436 | 6/1996 |
| DE | 4445436 A1 | 6/1996 |

(Continued)

OTHER PUBLICATIONS

"Japanese Application Serial No. 2014-239970, Office Action mailed Dec. 15, 2015", (w/ English Translation), 9 pgs.

(Continued)

*Primary Examiner* — Charles Bushey
(74) *Attorney, Agent, or Firm* — Schwegman Lundberg & Woessner, P.A.

(57) ABSTRACT

Electrically operated coffee machine, in particular espresso machine or fully automatic coffee machine, having a steam output device that can include a steam lance wherein the steam lance can include a milk inflow which is configured to supply milk into a steam output channel of the steam lance.

10 Claims, 4 Drawing Sheets

(56) References Cited

U.S. PATENT DOCUMENTS

Figure 1A:
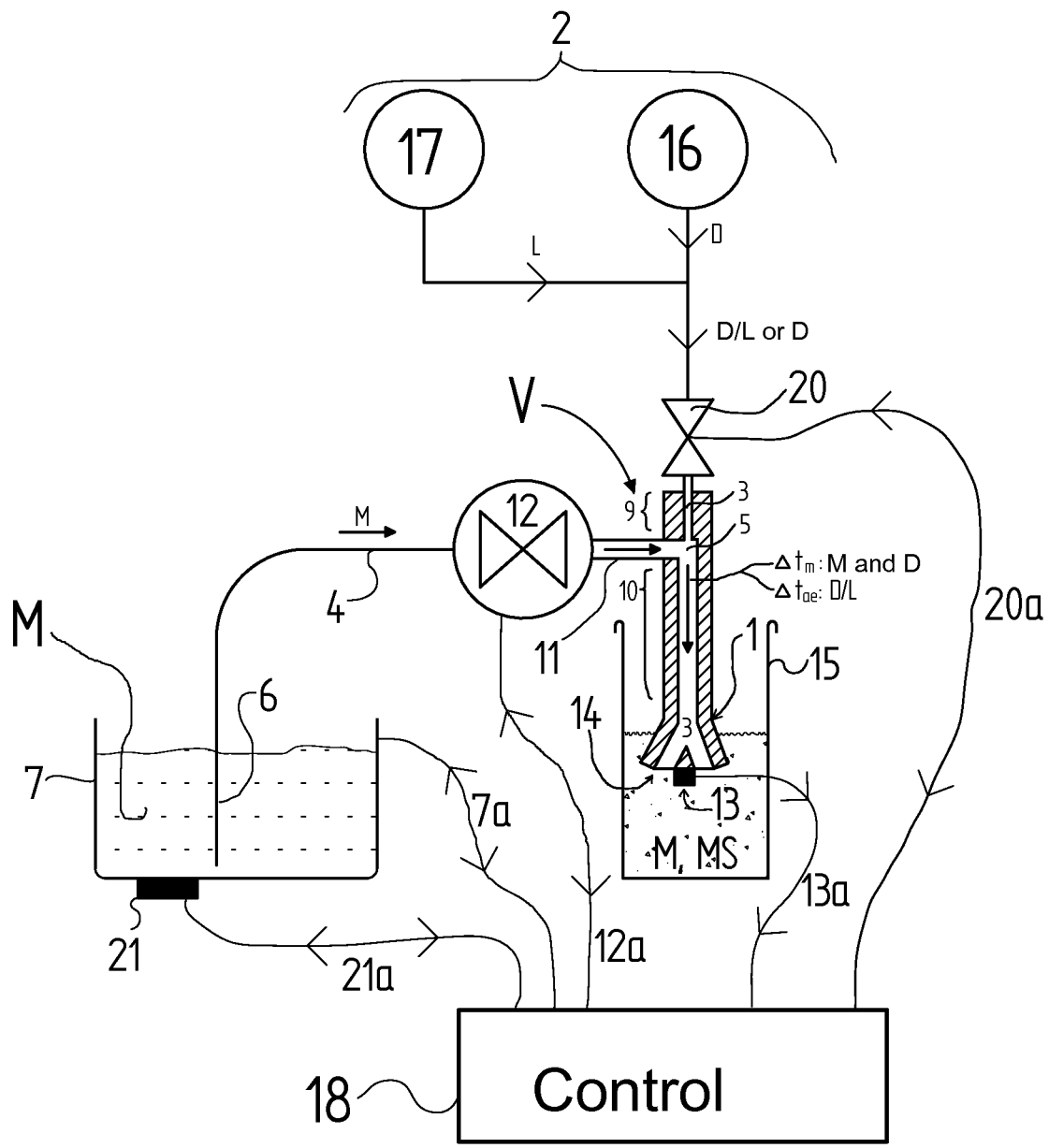

| | | | |
|---|---|---|---|
| 5,862,740 A * | 1/1999 | Grossi | A47J 31/4485 261/DIG. 16 |
| 6,019,032 A | 2/2000 | Arksey | |
| 6,099,878 A | 8/2000 | Arksey | |
| 7,104,184 B2 | 9/2006 | Biderman et al. | |
| 7,472,642 B2 | 1/2009 | Stieger et al. | |
| 8,003,148 B2 | 8/2011 | Schödler | |
| 8,336,448 B2 * | 12/2012 | Buttiker | A47J 31/4485 222/132 |
| 8,962,053 B2 * | 2/2015 | Carbonini | A47J 31/56 426/443 |
| 9,380,908 B2 * | 7/2016 | Aeberhard | A47J 31/4485 |
| 2006/0230943 A1 * | 10/2006 | Stieger | A47J 31/4485 99/279 |
| 2010/0212508 A1 * | 8/2010 | Buttiker | A47J 31/4485 99/290 |
| 2010/0236416 A1 | 9/2010 | Bönsch et al. | |
| 2012/0234186 A1 * | 9/2012 | Krug | A47J 31/4485 99/453 |
| 2013/0075939 A1 * | 3/2013 | Noordhuis | A47J 31/44 261/34.1 |
| 2013/0145936 A1 | 6/2013 | Dollner et al. | |
| 2013/0280403 A1 * | 10/2013 | Reyhanloo | A47J 31/4485 426/570 |
| 2014/0193558 A1 * | 7/2014 | Mosconi | A47J 31/4485 426/474 |
| 2014/0197554 A1 * | 7/2014 | Bonsch | A47J 31/4485 261/37 |

FOREIGN PATENT DOCUMENTS

| | | |
|---|---|---|
| DE | 102006049322 | 3/2008 |
| DE | 102011077776 | 12/2012 |
| EP | 2189085 A1 | 5/2010 |
| EP | 2229851 | 9/2010 |
| JP | 06-22856 A | 2/1994 |
| JP | 2000-157231 A | 6/2000 |
| JP | 2006-289096 A | 10/2006 |
| JP | 2007-525259 A | 9/2007 |
| JP | 2009-045463 A | 3/2009 |
| JP | 2013-000593 A | 1/2013 |

OTHER PUBLICATIONS

"European Application No. 14 192 943.0, Office Action mailed Nov. 27, 2015", (w/ English Translation), 6 pgs.

"German Application Serial No. DE 102013224400.2, Office Action mailed Jun. 24, 2014", (w/ English Translation), 7 pgs.

* cited by examiner

ELECTRICALLY OPERATED DRINK MAKER, IN PARTICULAR ELECTRICALLY OPERATED COFFEE MACHINE, WITH STEAM LANCE FOR FROTHING UP MILK

PRIORITY CLAIM TO RELATED APPLICATIONS

This application claims the benefit of priority of German Patent Application No. 10 2013 224 400.2, filed on Nov. 28, 2013, the benefit of priority of which is claimed hereby, and which is incorporated by reference herein in its entirety.

The present invention relates to an electrically operated drink maker, in particular an electrically operated coffee machine, with a steam lance configured for frothing up milk, to such a steam lance and a method for heating and/or frothing up milk. The present invention is described subsequently in more detail with the example of electrically operated coffee machines but can be used also with other milk-frothing drink makers (such as for example vending machines).

Automatic milk frothers are known from the state of the art, which comprise a milk storage container and also a milk supply line, a steam inflow and an air inflow and are provided (generally in the coffee machine) with a mixing chamber and a frothing chamber following the mixing chamber downstream. See here for example DE 44 45 436 A1, EP 2 229 851 A1 and also DE 10 2011 077 776 A1. These systems have the disadvantage however of a comparatively poor control of the froth quality and of the drink temperature and also of poor control with respect to the state of hygiene of the milk frothing system.

Furthermore, traditional milk frothers are known from the state of the art (in particular in conjunction with espresso machines) which use steam pipes (subsequently also termed steam lance within the scope of the present invention) which are generally disposed outside the housing of the espresso machine. On these steam pipes or steam lances, which can be swivelled generally relative to the housing of the espresso machine, there is situated a steam nozzle at the end orientated away from the machine, from which steam nozzle the steam can be discharged for frothing up milk in an external vessel into which the steam lance is immersed. A comparatively poor control over the drink quantity results here (this must be metered into the external frothing container or a residue is left over during emptying into the cup). In addition, an additional handling complexity for refilling the frothing container results. Also, the possibility of cooling the milk is absent.

Finally, traditional frothing with a steam pipe (or steam output pipe or steam lance) in a coffee machine also has the following problems: the procedure in day-to-day business, for example in cafés, is generally such that the operator of the machine puts the required quantity of milk, e.g. for a cappuccino, into a narrow, tall vessel and immerses the steam nozzle at the end of the steam lance into the vessel until just below the milk surface and actuates the steam supply of the machine. By circling the vessel and/or the steam jet or the steam lance, the milk is set in a swirling motion and hence frothed up. For hot milk the steam pipe is immersed deeply into the external vessel and supplied with a flow of steam. Thereafter, the milk or the milk froth is poured out of the external vessel and distributed to the cups. According to how well the operator can estimate, the quantity suffices exactly or it can be too little (so that a frothing step must be effected again). In order to prevent a repeat frothing step, generally too much milk is always used by the operator which then should really be removed from the external vessel for reasons of hygiene and taste. However, this residue of frothed-up milk frequently remains in the vessel and, when a drink with milk froth is next requested, is filled up with fresh milk and reused.

It is hence the object of the present invention to make available an electrically operated drink maker, in particular an electrically operated coffee machine with a steam lance (likewise a corresponding steam lance and also a corresponding heating and/or frothing-up method for milk) which prevents the disadvantages of the state of the art, in particular therefore enables improved control over froth quality and the state of hygiene of the milk frothing system, which helps to meter exactly the quantity of milk to be frothed up and which also hence prevents wastage of milk (whilst maintaining the hygiene specifications).

A drink maker can comprise a steam output device comprising a steam lance, wherein a milk inflow which is configured for a supply of milk into a steam output channel opens into the steam output channel of the steam lance. The object can also be achieved by a steam lance for connection to an electrically operated drink maker, wherein the steam lance has a plug-in connection, via which a milk inflow which can be configured for supply of milk into a steam output channel is capable of being connected to this steam output channel of the steam lance, wherein, in a state in which the milk inflow can be connected to the steam output channel and in which the steam lance can be connected to the drink maker. The object can also be achieved by a method for heating and/or frothing up milk with an electrically operated drink maker, wherein a milk inflow can be connected to a steam output channel of a steam lance connected to the drink maker and via a control unit comprising a microcontroller, a steam output device comprising the steam lance, a steam producer, a compressed air source, a milk conveying device. a flow interrupter and/or a temperature sensor of the drink maker are actuated such that, firstly over a first predetermined milk supply period of time $\Delta t_m$ or until reaching a predetermined conducted quantity of milk, milk from an external milk storage container can be conducted via the milk inflow and the steam output channel into an external vessel into which the steam lance has been immersed before subsequently over a second predetermined frothing-up and/or heating period of time $\Delta t_{ae}$ or until a predetermined temperature is reached, the milk now situated in this external vessel can be heated and/or frothed up by supply of steam and/or of a steam-air mixture via the steam output channel of the steam lance. Advantageous embodiments can be deduced from the dependent claims.

Subsequently, the present invention is described firstly in general then with reference to embodiments. The individual features and also method steps shown in combination with each other in the embodiments need not, within the scope of the invention, thereby be produced precisely in the shown example configurations. In particular, individual components and/or method steps can also be omitted or combined with each other constructively and/or in the course of the method in a different way. Even some of the shown features per se can represent an improvement to the state of the art.

The basic idea of the present invention is based on combining individual procedures and system components in an unusual manner. Thus, a coffee machine according to the invention can be provided with a control, comprise a steam lance, comprise an optional air supply line and be used in conjunction with an external milk storage container, this external milk storage container optionally being able to be cooled. The coffee machine can have a milk supply line (subsequently termed milk inflow for simplification) which can be provided with flow interruption means (e.g. a valve for the supply of the milk).

Preparation of the milk froth can be subdivided preferably into two temporal phases: a first phase of milk supply, the milk being able to be pumped by means of e.g. a milk pump from the external storage container via the milk inflow and a steam output channel of the steam lance into an external frothing vessel (e.g. cup). Or the milk can be pumped via a jet pump geometry (Venturi principle) by a steam jet into the frothing vessel. The jet pump can thereby be dimensioned such that the milk is heated as little as possible.

In the second step, the milk can be heated and/or frothed up by the milk supply being interrupted (stopping the pump or by a valve which interrupts the milk supply through the milk inflow) and it can be supplied to the external frothing vessel as long as steam is supplied via the steam discharge channel of the steam lance until a predetermined reference temperature of the milk and/or of the milk froth in the frothing vessel is reached (this can be achieved for example by means of a temperature sensor or a time control). Enough air can be supplied thereby to the steam that a desired froth quality can be achieved.

The use of a temperature sensor is however not necessary, the suctioned-in quantity of milk and also the storage temperature and the quantity of steam can be specified (or are known), the desired heating and/or frothing-up time can be calculated therefrom.

An electrically operated drink maker can can include a drink maker comprising a steam output device comprising a steam lance. wherein a milk inflow which can be configured for a supply of milk into a steam output channel opens into the steam output channel of the steam lance. (Subsequently, the present subject matter is illustrated respectively with a coffee machine, which is not however intended to be restrictive with respect to different milk-frothing types of drink makers).

The steam lance, i.e. the steam output pipe, is thereby generally an oblong throughflow pipe, at the one end of which a steam nozzle for steam discharge sits. Generally, the end of the steam lance opposite the steam nozzle (end upstream with respect to the steam) is connected via a flexible pipe piece to the housing of the coffee machine such that the entire steam lance is situated outside the housing. In this construction, the steam lance according to the invention can be swivelled in different directions for steam discharge. The steam lance together with the opening of the milk inflow into the steam output channel of the steam lance (and together with the entire milk inflow) is hence situated preferably completely outside the housing of the coffee machine.

According to the invention, the electrically operated coffee machine preferably has, in addition to the thus configured steam lance, no further mixing chamber (for bringing together milk, on the one hand, and steam, air or a steam-air mixture, on the other hand) and also no additional frothing chamber (for further mixing of the different fluids, such as milk, air and steam, already brought together in such a mixing chamber).

A basic idea of the present invention is hence that the steam lance which is generally situated outside the machine is used temporally in succession, both for throughflow of milk and subsequently for throughflow of steam, air or a steam-air mixture. The suctioning-in of the milk can thereby be effected according to the jet pump principle or according to the Venturi principle, the actual mixing of the quantity of milk guided as a result into the external vessel (cup) with steam, air and/or a steam-air mixture is subsequently effected not in the steam lance (or at least not in the opening region of the milk inflow into the steam output channel) but in the external vessel (for example in the region of the nozzle-side end of the steam lance). Instead of the Venturi principle, also a milk pump can however be used.

An electrically operated drink maker that includes an end of the milk inflow orientated away from the opening into the steam output channel can be configured for conveying milk from an external milk storage container into the milk inflow can have advantageously producible features.

The configuration of the steam lance, on the one hand, and of the milk inflow, on the other hand, is thereby effected preferably such that withdrawal of milk is effected out of the external milk storage container via the milk inflow and discharge of withdrawn milk which is conducted via the milk inflow, the opening and the steam output channel is effected via the nozzle at the end of the steam lance, which is orientated away from the opening, into a separately configured (separated from the external milk storage container) external vessel (cup or mug).

An electrically operated drink maker can include a milk conveying device including a milk pump for conveying milk through the milk inflow via the opening, into the steam output channel of the steam lance can have advantageously producible features. An electrically operated drink maker wherein the opening of the milk inflow into the steam output channel of the steam lance can be configured as a Venturi nozzle or comprises a Venturi nozzle, a portion of the steam output channel of the steam lance, which can be situated upstream of the opening with respect to the steam, forms the inlet of the Venturi nozzle, a portion of the steam output channel of the steam lance, which can be situated downstream of the opening with respect to the steam, forms the outlet of the Venturi nozzle and a portion of the milk inflow which leads into the opening and/or a connection of the steam lance for fluidic connection of the milk inflow to the steam output channel forms the take-off pipe of the Venturi nozzle can have advantageously producible features.

The opening of the milk inflow into the steam output channel (which can comprise the connection of the steam lance for fluidic connection of the milk inflow to the steam output channel) can be configured as a Venturi chamber, e.g., as the mixing chamber of a Venturi nozzle or comprise such a chamber.

An electrically operated drink maker can include a flow interrupter which can be configured for interrupting the throughflow of milk through the milk inflow, the flow interrupter being configured in the milk inflow can have further advantageously producible features.

An electrically operated drink maker can include a flow interrupter which can be configured for interrupting the throughflow of milk through the milk inflow, the flow interrupter being configured in the milk inflow is thereby effected preferably in combination with an electrically operated drink maker wherein the opening of the milk inflow into the steam output channel of the steam lance can be configured as a Venturi nozzle or comprises a Venturi nozzle, a portion of the steam output channel of the steam lance, which is situated upstream of the opening with respect to the steam, forms the inlet of the Venturi nozzle, a portion of the steam output channel of the steam lance, which can be situated downstream of the opening with respect to the steam, forms the outlet of the Venturi nozzle and a portion of the milk inflow which leads into the opening and/or a connection of the steam lance for fluidic connection of the milk inflow to the steam output channel forms the take-off pipe of the Venturi nozzle can have advantageously producible features.

The milk pump can also serve as flow interruption means when used with an electrically operated drink maker that includes a flow interrupter which can be configured for interrupting the throughflow of milk through the milk inflow, the flow interrupter being configured in the milk inflow (combination of the flow interruption function and of the pump function in one component).

An electrically operated drink maker can include a temperature sensor positioned on the steam nozzle of the steam lance and can be configured for measuring the temperature of milk and/or milk froth which is situated in an external vessel into which the steam lance is immersed can have advantageously producible features. An electrically operated drink maker wherein the steam output device comprises a steam producer and a compressed air source for supply of steam and or a steam-air mixture into the steam output channel of the steam lance, in particular into a/the portion of the steam output channel of the steam lance which can be situated upstream of the opening with respect to the steam can have advantageously producible features. An electrically operated drink maker that includes a microcontroller, with which the steam output device, a steam producer, a compressed air source, a milk conveying device a flow interrupter and/or a temperature sensor, preferably all of the above-mentioned components present, can be actuatable such that, firstly over a first predetermined milk supply period of time $\Delta t_m$ or until reaching a predetermined conducted quantity of milk, milk from an external milk storage container can be introduced via the milk inflow, the opening and the steam output channel into an external vessel into which the steam lance can be immersed, before subsequently over a second predetermined frothing-up and/or heating period of time $\Delta t_{ae}$ or until a predetermined temperature is reached, the milk now situated in this external vessel can be heated and/or frothed up by supply of steam and/or of a steam-air mixture via the steam output channel of the steam lance can have advantageously producible features. These features can be independent of each other.

The milk supply period of time $\Delta t_m$ is preferably between 8 and 22 seconds, the frothing-up and/or heating period of time $\Delta t_{ae}$ is preferably between 10 and 15 seconds. The predetermined temperature of milk and/or milk froth to be reached in the external vessel (preferably measured via the temperature sensor) is preferably between 60° C. and 70° C.

It can be frothed up also for as long as required until a predetermined froth quality is achieved. For this purpose, a memory (e.g. as part of the control unit) can be provided, in which, in a look-up table, time intervals and relative quantity ratios of steam and air (in a steam-air mixture) can be stored and selected for different froth qualities to be achieved with defined quantities of milk. The predetermined achieved temperature thereby generally relates to the milk and/or the milk froth in the external vessel. However, the temperature sensor can thereby also be dispensed with by the heating- and/or frothing-up times being calculated alternatively from the suctioned-in quantity of milk, from the storage temperature (which then must generally be measured in turn by a further temperature sensor on the preferably coolable milk storage vessel) and from the quantity of steam. The calculation can thereby be effected via the heat energy of the milk according to $Q=c \times m \times \Delta t$, Q being the heat energy, c the specific heat capacity (which in the case of milk is 3.85 kJ/(kg×K), m the milk mass and $\Delta t$ the desired heating in Kelvin. The required energy can be deduced herefrom, from which then the required quantity of steam can be determined with the specific heat capacity of water vapour. From the used steam pressure (for example 1.2 bar) and the used nozzle cross-section of the nozzle at the end of the steam lance (for example 1.5 to 2.5 mm) there then follows the time duration which is required to apply the required quantity of steam.

Further advantageously producible features of the coffee machine can be that the steam lance can include, in addition to the steam output channel into which the milk inflow opens, can also include a further steam output channel. The further steam output channel can thereby be configured likewise for steam discharge from the steam output device into the external vessel, like the first steam output channel of the steam lance. Preferably there is thereby no fluidic connection or, at least downstream of the opening of the milk inflow into the first steam output channel, no fluidic connection between the first steam output channel, on the one hand, and the further steam output channel. The further steam output channel (which can be actuated for example via the control unit) can be actuated such that the latter discharges steam only during the frothing-up and/or heating period of time $\Delta t_{ae}$, or until a predetermined temperature is reached, then the first steam output channel can be able to be switched off during this time by the control unit. The alternate switching on and off of the throughflow through the two steam output channels can hence be effected by the control unit and, furthermore, preferably based on suitably disposed valves. The first steam output channel and the further steam output channel can also be configured as channels (double pipe) which extend in parallel.

A particular steam lance according to the present subject matter can include a steam lance for connection to an electrically operated drink maker. The steam lance can include a plug-in connection, via which a milk inflow which is configured for supply of milk into a steam output channel that can be capable of being connected to this steam output channel of the steam lance wherein, in a state in which the milk inflow is connected to the steam output channel and in which the steam lance is connected to the drink maker.

The present subject matter can include a method for heating and/or frothing up milk with an electrically operated drink maker. An operation can include a milk inflow that is connected to a steam output channel of a steam lance connected to the drink maker and via a control unit comprising a microcontroller, a steam output device comprising the steam lance, a steam producer, a compressed air source, a milk conveying device, a flow interrupter and/or a temperature sensor of the drink maker are actuated such that, firstly over a first predetermined milk supply period of time $\Delta t_m$ or until reaching a predetermined conducted quantity of milk, milk from an external milk storage container is conducted via the milk inflow and the steam output channel into an external vessel into which the steam lance has been immersed. Another operation can include, over a second predetermined frothing-up and/or heating period of time $\Delta t_{ae}$ or until a predetermined temperature is reached, the milk now situated in this external vessel is heated and/or frothed up by supply of steam and/or of a steam-air mixture via the steam output channel of the steam lance.

Figure 1B:
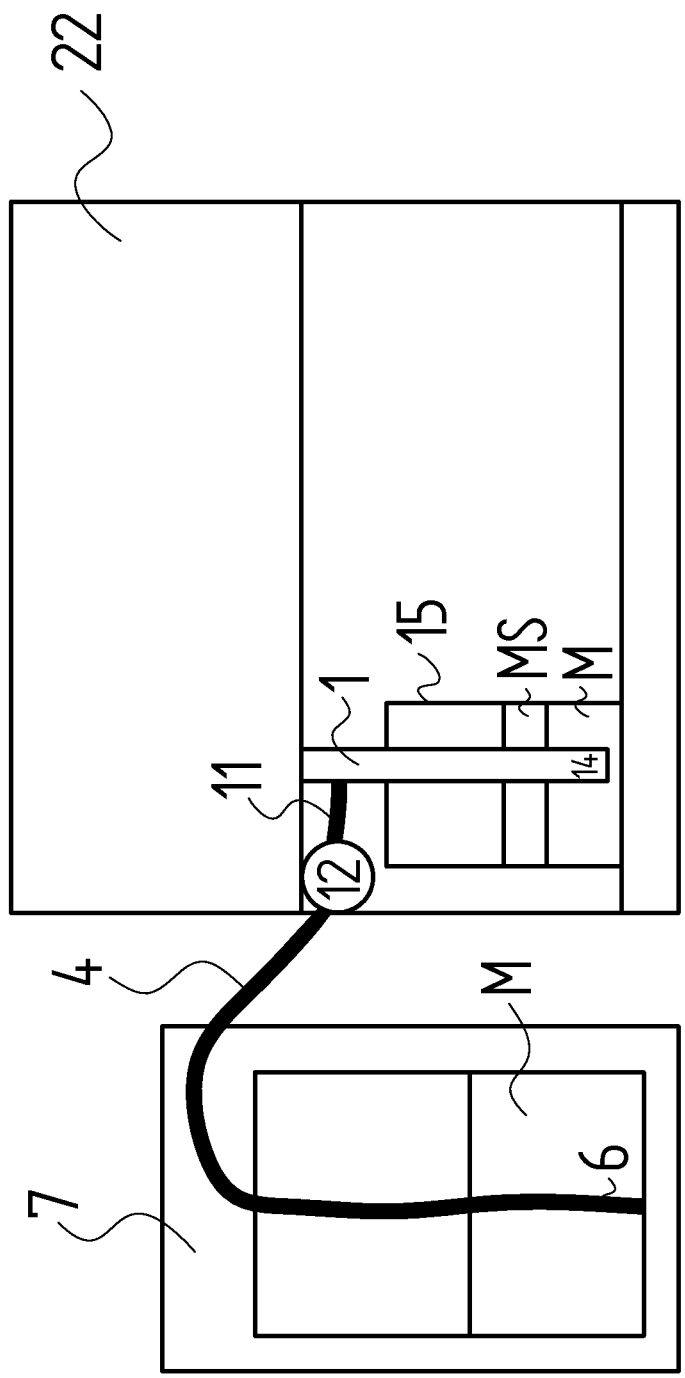

Subsequently, the description of several embodiments is effected. There are thereby shown:

FIGS. 1*a* and 1*b* a first embodiment which uses a pinch valve 12 in the milk inflow 4.

Figure 2:
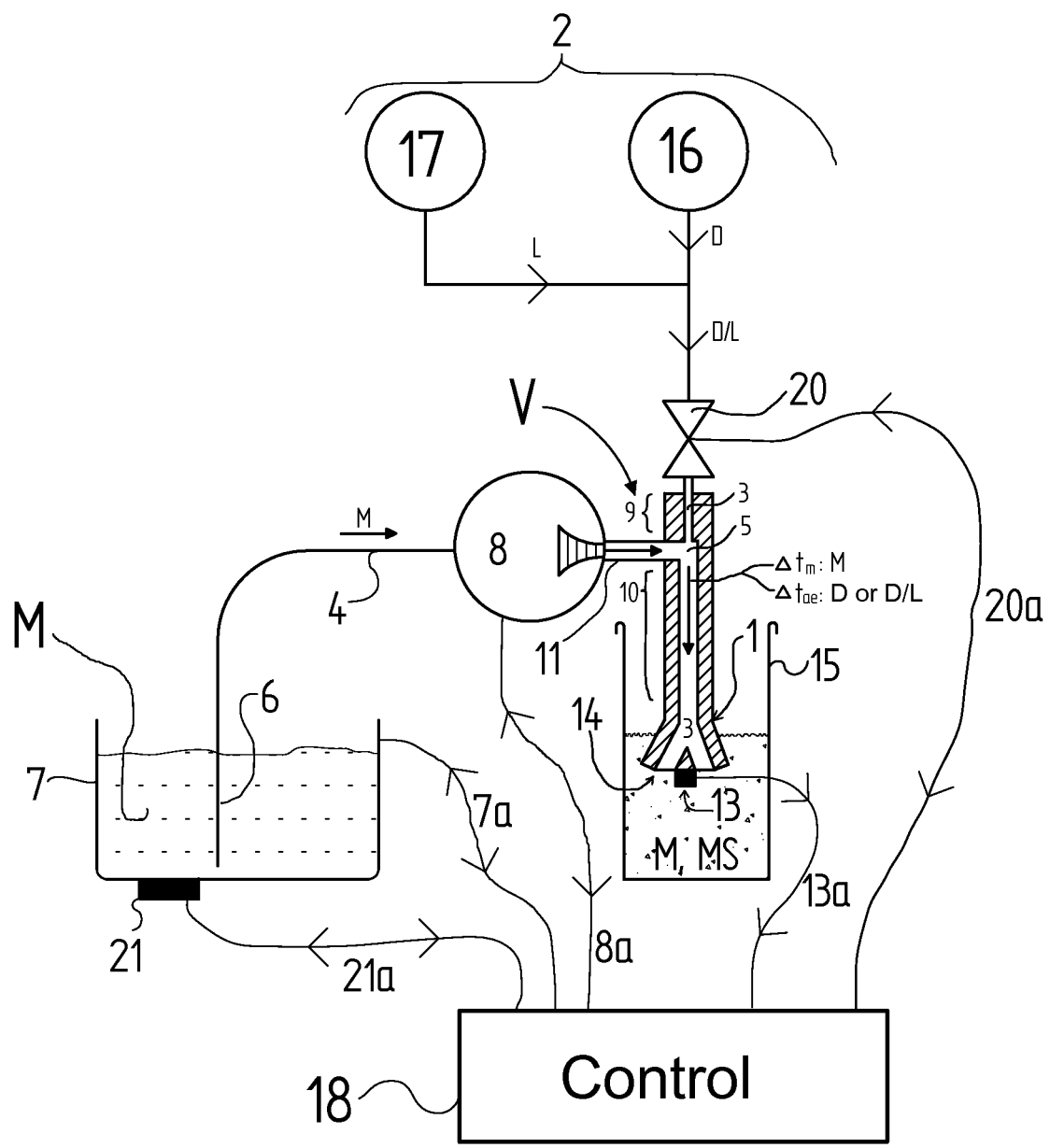

FIG. 2 a second embodiment which uses a milk pump 8 instead of the pinch valve 12 in the milk inflow 4.

Figure 3:
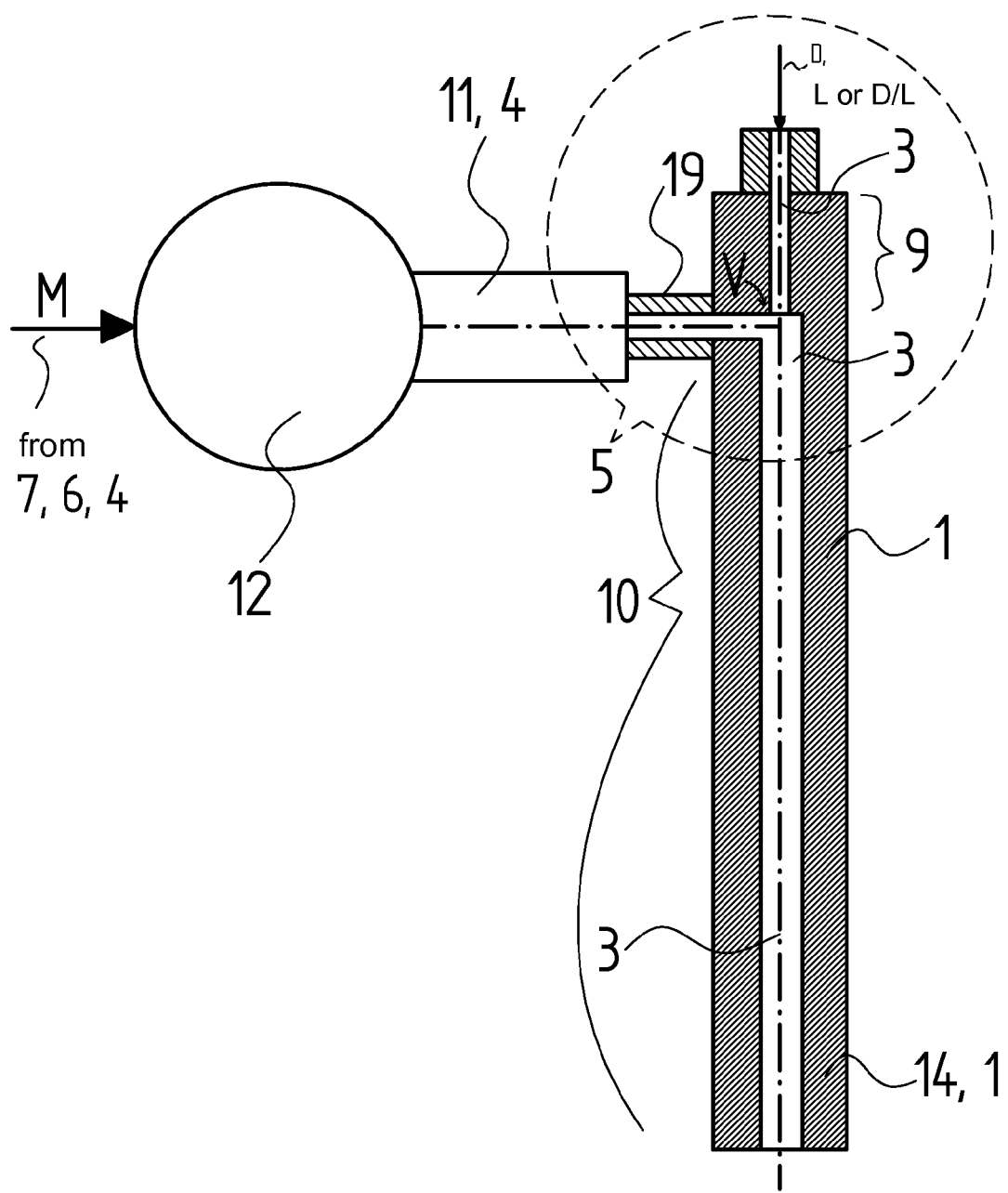

FIG. 3 a specific construction according to the invention of a steam lance 1 (as can be used in particular also in the embodiments according to FIGS. 1a, 1b and 2).

FIG. 1a illustrates schematically the construction and mode of operation of an electrically operated coffee machine according to the invention in the form of a fully automatic coffee machine with a steam lance according to the invention.

The coffee machine comprises a steam output device 2 with the steam lance 1 according to the invention and also, upstream of the steam lance 1 with respect to the steam, with a compressed air source 17 and a hot steam source 16. The construction of such compressed air sources and steam sources and also the control of the same is fundamentally known to the person skilled in the art, compare here for example DE 44 45 436 A1 or DE 10 2011 077 776 A1 so that description of the precise mode of operation of these sources is dispensed with. An output line of the compressed air source 17, the conveying device of which is characterised with an arrow and which is provided with reference L (air supply) opens downstream of the steam source 16 into the output line of this steam source (the latter is designated with D for steam supply). Downstream of the opening, an (adjustable with respect to the ratio of the proportion of air L and the proportion of steam D) steam-air mixture D/L is hence present and can be conducted through a steam valve 20 which is positioned in an inflow from the two sources 16, 17 to the steam output channel 3 of the steam lance 1 according to the invention. The supply of air L can be switched off so that also pure steam D can be conducted through the valve 20 into the channel 3.

Downstream of the valve 20 with respect to the fluid, the supply line for the steam-air mixture D/L opens outside the housing 22 of the coffee machine (cf. FIG. 1b) into the end of the steam lance 1 orientated away from the nozzle. The steam lance 1 here is configured completely outside the housing 22 of the coffee machine and can be swivelled relative to the housing (not shown).

Downstream, with respect to the fluid, of the end of the lance 1 orientated away from the nozzle, a milk inflow 4 opens at the side into the steam output channel 3 of the steam lance 1 at an angle of 90°. By means of this opening 5, the steam output channel 3 is hence subdivided into two portions, a portion 9 which is situated upstream of the opening 5 with respect to the steam and a portion 10 of the steam output channel 3 which is situated downstream of the opening 5 with respect to the steam. The portion 9 which is situated upstream with respect to the steam is thereby configured as the inlet of a Venturi nozzle V, the portion 10 which is situated downstream with respect to the steam is configured as the outlet of this Venturi nozzle and the portion 11 of the milk inflow 4 which is situated orientated towards the steam lance 1 (which leads into the steam output channel 3) forms the take-off pipe of this Venturi nozzle V. In order to produce the Venturi nozzle construction V, the pipe inner diameter of the portion 9 which is situated upstream, here at 2 mm, is half as large as the pipe inner diameter of the two portions 10 and 11 which here are respectively 4 mm.

If hence steam D, air L and/or a mixture D/L thereof flows through the portion 9, then (when the valve 12 is open, see subsequently) milk M is entrained via the line 4 into the opening 5 and through the portion 10 which is situated downstream and discharges out of the end situated opposite the portion 9 (which end is provided with the nozzle 14) of the steam lance 1.

Upstream of the portion 11 of the milk inflow 4 which leads into the opening 5, a pinch valve 12 is positioned in said milk inflow for blocking and reopening the milk inflow 4. At the upstream end 6, i.e. situated opposite the portion 11, the milk inflow 4 is configured such that this end 6 ends in the base region of an external, coolable milk storage container 7. In order to maintain the temperature of milk M situated in this container 7, this container 7 is provided with a temperature sensor 21.

Also the nozzle-side 14 end of the steam lance 1 has a temperature sensor 13, with which the instantaneous temperature of milk M or an already present milk froth mixture MS in an external vessel 15 (e.g. a tall, narrow vessel in which the frothing-up of the milk is intended to be effected) can be detected.

Via bidirectional data lines 7a, 12a, 13a, 20a and 21a, the coolable milk storage container 7, the pinch valve 12, the temperature sensor 13 on the nozzle 14 of the steam lance 1, the steam valve 20 and also the (further) temperature sensor 21 on the coolable milk storage container 7 are connected respectively to the central control unit 18 of the fully automatic coffee machine. Via the control unit 18, control signals can hence be emitted to the respective components and data signals of these components (for example detected parameters or also actuation signals) can be detected. Thus the control unit 18 can take over coordination of the opening and closing of the two valves 12, 20, via the lines 12a and 20a, can detect the current temperature at the container 7 via the line 21a and, based thereon, can if necessary increase or reduce the cooling performance of the container 7 via the line 7a and end the frothing-up of the milk M situated in the external vessel 15 when the temperature sensor 13 reports reaching a predetermined milk froth temperature via the line 13a.

According to the invention, the operation can hence be effected as follows: firstly the lance 1 together with its nozzle-side 14 end of the lance 1 is immersed in the vessel 15. Then the operator switches on the supply of milk M from the container 7 via a (not shown) selector switch on the housing 22 of the fully automatic coffee machine, as a result of which opening of the valve 12 with simultaneous opening of the valve 20 by means of the control unit 18 is effected. The air supply L from the source 17 thereby remains closed so that merely steam D from the source 16 flows through the line 3 of the lance 1 and thereby entrains milk M via the line 4 out of the container 7 according to the Venturi effect in the opening 5. The discharge speed of the steam D is determined by the constant steam pressure (1 to 2 bar) and the nozzle cross-section.

If sufficient milk M has been admitted into the vessel 15 by means of the steam D (or a predetermined time $\Delta t_m$ of the milk inflow M has elapsed), then a switch-over is made to frothing operation via the control 18 by means of a repeat switch actuation (not shown) on the housing 22. This is effected by closing the valve 12 so that no further milk suction via the line 6, 4, 11 is effected. Instead, the air supply of the source 17 is opened via the control unit 18 (actuation of both sources is not shown here in detail) so that now a D/L mixture with a prescribed mixture ratio of steam D and air L flows through the valve 20 and the lance 1. Hence the milk M situated in the vessel 15 is frothed up in the nozzle region 14 by suitable construction of this region (such constructions are known per se to the person skilled in the art). The frothing-up can thereby be effected over a predetermined time duration $\Delta t_{ae}$ which is adjustable with the control unit 18, or optionally interrupted only when the milk froth temperature reaches a predetermined value (which is established via the temperature sensor 13).

Hence, in a first step, milk can be supplied via a hose or a pipe with a diameter of 4 mm by steam D being supplied via a pipe cross-section here of 2 mm (in general cross-sections of 1.8 to 3 mm can usually be used here) and at a high flow velocity (120° C. and 1.2 bar) in order to entrain the milk M according to the Venturi principle and to transfer it into the vessel 15. The milk supply is thereby effected at right angles to the steam in order to produce the Venturi effect and to pump the milk into the frothing vessel 15. Due to the steam feed which is used for pumping, generally a temperature increase of approx. 20 to 25° C. is produced in the pumped milk M. During subsequent frothing-up in the time interval $\Delta t_{ae}$, generally a temperature of the milk in the vessel 15 of approx. 60 to 70° C. is achieved. Additional diaphragms (for reducing the milk inflow) and a separate frothing chamber which would have to be used in order to swirl the milk before it can be discharged into an external vessel are hence not necessary with the system according to the invention.

The pinch valve 12 can be constructed such that the milk inflow through the line 4 can be released and blocked again with separated media.

FIG. 1b illustrates schematically the outer shape of the construction of the coffee machine illustrated in FIG. 1a, which shows that the coolable milk storage container 7 can have a separate housing. By means of the upstream end 6 of the line 4, the milk M is admitted via the milk inflow 4, the pinch valve 12 disposed therein and also the downstream, inflowing portion 11 at the side into the steam output channel (not shown here) of the steam lance 1, in order to be pumped into the vessel 15 through the nozzle-side 14 end of the steam lance by means of the steam D. Subsequently, frothing-up is effected by discharge of the D/L mixture at the same speed relative to the speed of the pumping process so that the milk M is frothed up in the vessel 15 to form milk froth MS. As FIG. 1b illustrates, the complete steam lance construction is situated outside the housing 22 of the fully automatic coffee machine.

FIG. 2 illustrates the construction of a further fully automatic coffee machine according to the invention with a steam lance according to the invention. The construction is basically as described for FIGS. 1a and 1b so that only the differences are described subsequently.

Constructively, the pinch valve 12 in the construction of FIGS. 1a, 1b is replaced by a milk pump 8 which is positioned in the milk inflow 4 in the form or a toothed or peristaltic pump (squeezed tube pump). This can be actuated by the control unit 18 via the bidirectional data line 8a. Merely the elements 12, 12a from FIG. 1a are hence omitted.

The geometric construction of the steam lance 1, i.e. the steam output channel 3 thereof, the opening 5 thereof, portions 9 and 10 thereof together with the nozzle 14 with the temperature sensor 13, is described as for Figures 1a and 1b. However, when using a milk pump 8, the construction of the opening 5 as Venturi nozzle V is not absolutely necessary and can be replaced by a simple T-shaped pipe piece.

With the construction shown in FIG. 2, inflow of milk and subsequent frothing-up and/or heating of milk can be effected as follows: firstly, over a first time interval $\Delta t_m$ or until a predetermined quantity of milk M has been introduced in the vessel 15, milk is conveyed into the latter vessel with a closed steam valve 20 by means of the milk pump 8 from the milk storage container 7 via the milk inflow 4, the portion 11, the opening 5 and the portion 10 and also the nozzle 14 in order to fill the vessel 15 with a predetermined quantity of milk. Then the pump 8 is switched off and the valve 20 is opened via the line 20a by means of the control unit 18. If the milk M situated in the vessel 15 is intended to be merely heated, then merely hot steam D from the source 16 is admitted into the vessel 5 over a defined time interval $\Delta t_{ae}$ or until the temperature sensor 13 of the control unit 18 reports having reached a predetermined milk temperature M of for example 70° C. Subsequently, the valve 20 is closed so that (when the line 4 is still closed by means of the pump 8) the vessel 15 together with the heated milk M situated therein can be removed from the steam lance 1. If, on the other hand, frothing-up of the milk M pumped into the vessel 15 is intended to be effected, then, when the pump 8 is switched off, the supply of a predetermined D/L mixture of air L and steam D via the valve 20, the portions 9 and 10 and also the nozzle 14 is effected over a second time interval $\Delta t_{ae}$ following the first time interval $\Delta t_m$ in order during this time interval $\Delta t_{ae}$ (or likewise until a predetermined temperature is reached) to froth up the milk M in the vessel 15 to form milk froth MS (and thereby to heat it at the same time). Subsequently, closure of the valve 20 is effected while the pump 8 is still switched off so that the vessel 15 with the frothed-up milk froth MS can be removed from the steam lance 1.

If the coffee machine is operated with the pump 8 instead of the valve 12, the metering time for a desired quantity of milk in the vessel 15 can be derived from the conveyed quantity of the pump 8. This construction has the advantage that the milk is not heated by pumping into the vessel 15 (in contrast to using the Venturi effect). In the second step, the milk inflow 4 is closed by switching off the pump 8 and steam (for heating) or a steam-air mixture (for heating and frothing-up) is conducted into the milk M in the vessel 15 until a predetermined time has elapsed or until the desired temperature is reached. The temperature can, as described already, be detected via the temperature sensor 13, preferably an NTC-based sensor in the froth nozzle. If no air is supplied, then the milk is only heated, since the steam in the milk condenses and does not form any bubbles; with an increasing proportion of air L in the mixture D/L, the proportion of milk froth is then increased.

Finally, FIG. 3 shows an example of a steam lance construction according to the invention in a cross-section in a plane in which the central longitudinal axes of the line portion 11 and also of the steam output channel 3 are situated. This steam lance 1 can be used in the coffee machines described in both FIGS. 1, 1a and also 2. However it can also be used as a separate component in conjunction with other coffee machine constructions by removing the steam lance of such a construction and replacing it with the steam lance shown in FIG. 3.

Identical reference numbers again describe identical components in FIG. 3 as are shown already in FIGS. 1, 1a and 2 so that description thereof is omitted.

As is shown in more detail in FIG. 3, the portion 11 of the milk inflow 4 which leads into the opening 5 and also the entire milk inflow 4 (not shown here) is configured as a flexible silicone hose. Alternatively thereto (not shown) also a configuration of the portion 11 or of the line 4 as milk supply pipe made of plastic material is possible.

In the region of the opening 5, the steam lance 1 has a connection 19 which is configured as a short, rigid pipe portion and leads at the side into the steam output channel 3 at 90°. The portion 11 is coupled to the connection 19 by the inner diameter of the portion 11 being slightly smaller than the outer diameter of the pipe portion of the connection 19 so that the end of the portion 11 orientated away from the valve 12 has been slipped over the end of the connection 19 orientated away from the steam output channel 3 (flexibility of the silicone hose) and remains there in a frictional fit.

The cylindrical body of the actual steam lance 1, which forms the two portions 9 and 10 of the steam output channel 3 and hence the latter channel and is provided with a boring for the channel 3 is configured together with the connection 19 which leads away at 90° in one part as a stainless steel pipe construction. On the end thereof orientated away from the nozzle 14, the steam lance body has a tapering which serves for connection to the inflow from the sources 16, 17 and the valve 20. This connection can be configured as a plug-in connection or as a threaded connection. The further configuration of the illustrated steam lance is as described for FIGS. 1a, 1b and 2.

Alternatively (not shown), it is also possible to provide the steam lance with two channels (for example configured as a double pipe) in the Venturi principle design. One of the channels can then be used for the purpose of entraining milk into the vessel 15 according to the Venturi effect or pumping it, the other channel can then serve exclusively for supplying steam and/or air for heating and/or frothing-up.

The invention claimed is:

1. An electrically operated drink maker said drink maker comprising:
   a housing;
   a milk storage container configured to be external to the housing;
   an external vessel configured separately from the milk storage container,
   a steam output device, wherein the steam output device includes:
      a steam lance situated outside the housing of the drink maker and configured to be immersed into the external vessel, and
      a milk inflow configured to supply milk into a steam output channel of the steam lance;
   a control unit including a memory module configured to actuate one or more components of the drink maker such that, firstly over a first predetermined milk supply period of time ($\Delta t_m$), milk from the milk storage container is introduced into the external vessel via the milk inflow, the opening, and the steam output channel, before subsequently over a second predetermined frothing-up and heating period of time ($\Delta t_{ae}$), the milk now situated in the external vessel is heated or frothed up by supply of steam or of a steam-air mixture via the steam output channel of the steam lance into the external vessel;
   wherein the memory module is configured to store a plurality of periods of time, including the first predetermined milk supply period of time and the second predetermined frothing-up and heating period of time; and
   wherein the control unit is configured to allow a user to select one of the plurality of periods of time such that one or more components of the drink maker are actuated.

2. The drink maker according to claim 1, wherein the end of the milk inflow orientated away from the opening into the steam output channel is configured for conveying milk from the external milk storage container into the milk inflow.

3. The drink maker according to claim 1, comprising a milk conveying device for conveying milk through the milk inflow via the opening into the steam output channel of the steam lance.

4. The drink maker according to claim 1, wherein the opening of the milk inflow into the steam output channel of the steam lance is configured as a Venturi nozzle or comprises a Venturi nozzle, a portion of the steam output channel of the steam lance, which is situated upstream of the opening with respect to the steam, forms the inlet of the Venturi nozzle, a portion of the steam output channel of the steam lance, which is situated downstream of the opening with respect to the steam, forms the outlet of the Venturi nozzle and a portion of the milk inflow which leads into the opening and/or a connection of the steam lance for fluidic connection of the milk inflow to the steam output channel forms the take-off pipe of the Venturi nozzle.

5. The drink maker according to claim 1, comprising a flow interrupter which is configured for interrupting the throughflow of milk through the milk inflow, the flow interrupter being configured in the milk inflow.

6. The drink maker according to claim 1, comprising a temperature sensor that is positioned on a steam nozzle of the steam lance and is configured for measuring the temperature of milk and/or milk froth which is situated in the external vessel into which the steam lance is immersed.

7. The drink maker according to claim 1, wherein the steam output device comprises a steam producer and a compressed air source for supply of steam and/or a steam-air mixture into the steam output channel of the steam lance.

8. The drink maker according to claim 1, wherein the steam lance, in addition to the steam output channel into which the milk inflow opens, has a further steam output channel.

9. The drink maker according to claim 1, wherein the steam lance includes a connection, via which the milk inflow, which is configured for supply of milk into the steam output channel, can be connected to the steam output channel of the steam lance.

10. The drink maker of claim 1, wherein, the control unit is configured to actuate the components from the group consisting of: the steam output device, a steam producer, a compressed air source, a milk conveying device, a flow interruption means, and a temperature sensor.

* * * * *